United States Patent [19]
Lindell

[11] Patent Number: 4,586,531
[45] Date of Patent: May 6, 1986

[54] VALVE ARRANGEMENT

[75] Inventor: Curt O. Lindell, Täby, Sweden

[73] Assignee: Toolex Alpha AB, Sundbyberg, Sweden

[21] Appl. No.: 653,060

[22] Filed: Sep. 21, 1984

[30] Foreign Application Priority Data

Sep. 22, 1983 [SE] Sweden ................................. 8305124

[51] Int. Cl.⁴ .......................................... F16K 31/122
[52] U.S. Cl. .................................. 137/334; 137/881; 137/885
[58] Field of Search ............. 91/454; 137/334, 596.14, 137/596.15, 596.16, 881, 885

[56] References Cited

U.S. PATENT DOCUMENTS 2,891,518  6/1959  Krapf ........................ 137/596.15 X
3,556,144  1/1971  Bickers ......................... 137/596.15
3,838,710  10/1974 Reip ............................ 137/596.15

FOREIGN PATENT DOCUMENTS 1583071  1/1981  United Kingdom .

Primary Examiner—Gerald A. Michalsky
Attorney, Agent, or Firm—Birch, Stewart, Kolasch & Birch

[57] ABSTRACT

The invention relates to a valve arrangement for supply steam and cooling water under pressure alternately to a compression moulding tool, via respective inlet valves. Upstream of the inlet valve cooling water taken from the cooling-water circuit is passed to piston arrangements, which act upon the inlet valves, and is used both as a working medium for the piston arrangements and as a cooling agent therefor.

3 Claims, 1 Drawing Figure

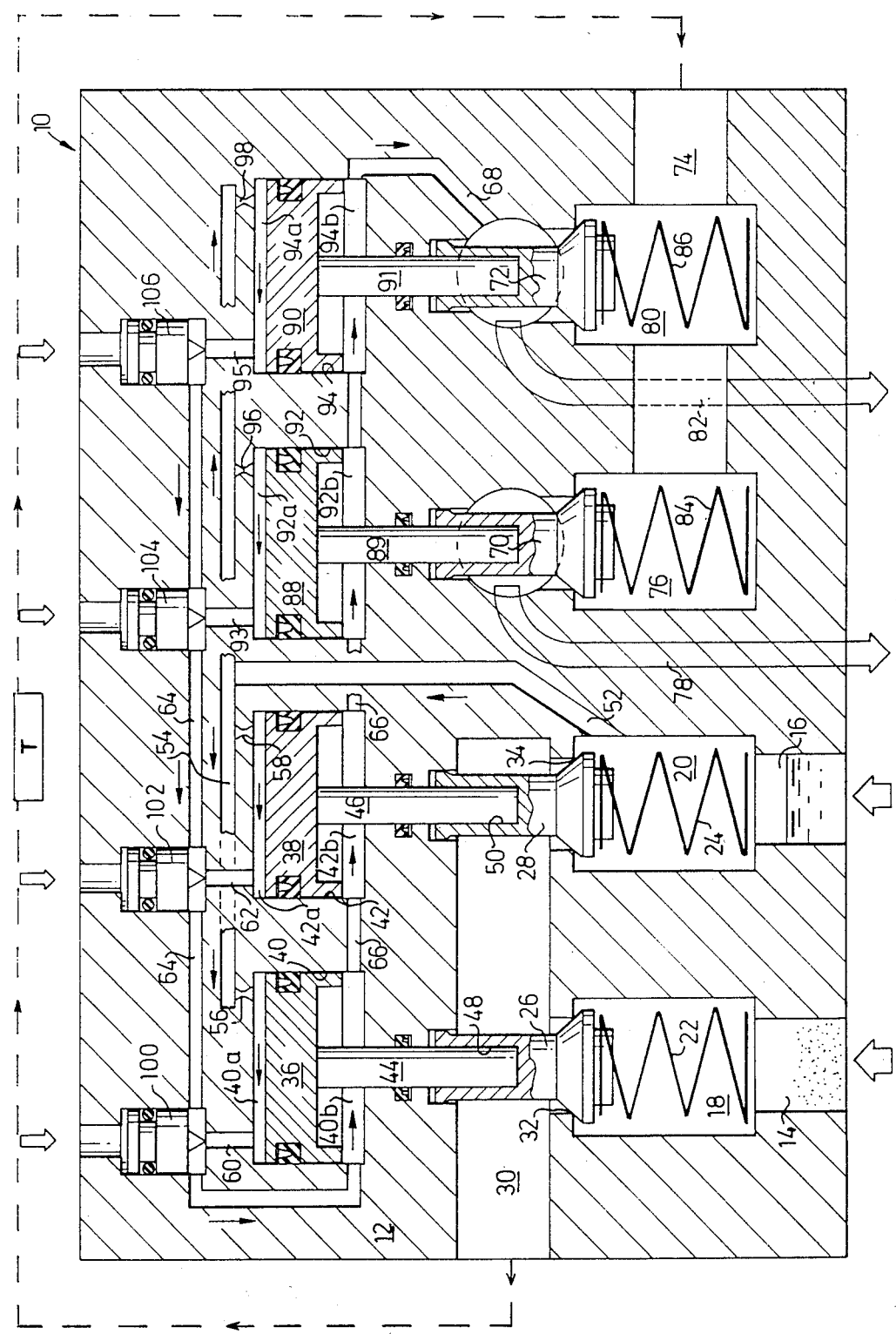

VALVE ARRANGEMENT

BACKGROUND OF THE INVENTION

1. Field of the Invention

The present invention relates to a valve arrangement for alternately supplying a heating medium, preferably steam, and a coolant, preferably water, to at least one compression moulding tool intended particularly for moulding audio or video discs, the arrangement comprising firstly a valve-housing body having an inlet passage for the heating medium and an inlet passage for the coolant, these inlet passages discharging into an outlet passage which is common to all inlet passages; secondly an inlet valve located between respective inlet passages and the common discharge passage, the inlet valves being biased towards a respective valve seat; and thirdly a respective auxiliary means arranged to co-act with each inlet valve to alternately open said valves.

2. Description of Background Art

When producing audio-discs and video-discs by means of compression-moulding techniques, using a compression moulding tool, hot pressurized steam and cold, pressurized water are fed alternately to the compression moulding tool, for the purpose of rapidly heating and cooling the same. This supply of heating and cooling medium to the tool is normally controlled with the aid of a valve arrangement in which the respective steam and cold-water inlet valves are controlled so that steam and water are fed alternately to the compression moulding tool through a common pipe-system. This control of the respective inlet valves is effected with the aid of separate pneumatic or hydraulic auxiliary devices.

One disadvantage with pneumatic auxiliary devices is that due to the compressibility of the working media used, it is difficult to regulate the speed at which the pistons controlling the opening and closing of the valves move, resulting in very rapid valve movement. Such rapid movement causes pressure surges and vibrations to occur in the system, for circulating the working media, especially when closing the liquid-coolant inlet valves, and subjects the valve bodies and valve seats to high stresses and strains.

This disadvantage is not found with hydraulic auxiliary devices, in which it is possible to control valve movement more thoroughly, so as not to create problematic pressure surges in the medium circulating system. One problem encountered with hydraulic auxiliary devices, however, is that the seals and other components of the devices are subjected to high stresses, inter alia in the form of thermal stresses caused by the conduction of heat from the working media and the rapid changes in temperature resulting therefrom.

SUMMARY AND OBJECTS OF THE INVENTION

An object of the present invention is to overcome the disadvantages inherent with the known technique and to provide a valve arrangement in which the working-media inlet valves and the auxiliary devices co-acting therewith are integrated in a common valve housing, and in which the auxiliary devices are arranged to be operated by one of said working media, namely the liquid coolant, under simultaneous constant cooling of the auxiliary device and its associated seals, thereby to obtain a compact and operationally reliable valve arrangement in which occurring thermal stresses and strains are minimal.

To this end, the valve arrangement described in the introduction is characterized in that each of the auxiliary devices has the form of a hydraulic piston which is mounted in the valve-housing body and which acts upon a respective inlet valve through an associated piston rod, in a valve-opening direction; in that the hydraulic medium driving the hydraulic pistons comprises the liquid coolant and is conducted away from the coolant inlet passage via a supply passage communicating with a first cylinder space on one side of respective pistons, said first cylinder space in turn communicating with a second cylinder space on the other side of respective pistons via a return-flow passage, said return-flow passage co-acting with a pilot valve operative to close said passage, and in that hydraulic coolant leaves the valve arrangement from said second cylinder space through an outlet passage.

The valve-housing body also suitably has arranged therein outlet valves for the respective working media, which outlet valves and their respective auxiliary devices may be identical to the inlet valves and their auxiliary devices, and may also operate alternately, synchronously with the inlet valves.

BRIEF DESCRIPTION OF THE DRAWING

The invention will now be described in more detail with reference to the accompanying drawing, the single FIGURE of which is a schematic cross-sectional view of a valve arrangement according to the invention, and illustrates the arrangement in its state of rest.

DETAILED DESCRIPTION OF A PREFERRED EMBODIMENT

The illustrated valve arrangement is generally referenced 10 and comprises a body 12, which for reasons relating to manufacture consists of a plurality of block sections, not shown in the drawing. Provided in the body 12 is an inlet passage for the heating medium used, normally hot steam, and an inlet passage 16 for a liquid coolant, suitably water. The inlet passages 14 and 16 open into a respective chamber 18 and 20, each of which accommodates a respective thrust spring 22 and 24 acting upon a valve body 26 and 28, for supplying steam and water respectively to a common outlet passage 30 connected to one or more compression moulding tools T. The pressure exerted by the springs 22 and 24 and the working media in the inlet passages act upon the valve bodies 26 and 28 in a valve closing direction, towards a respective valve seat 32 and 34.

The inlet valves 26,28 are arranged to be opened alternately by means of associated auxiliary devices in the form of pressurized-water operated pistons 36 and 38 respectively arranged for axial movement in a respective cylinder chamber 40 and 42. The pistons 36,38 act upon one end of a respective piston rod 44 and 46, which are guided for axial movement in the valve-housing body in a respective blind guide bore 48 and 50 located in respective valve bodies 26 and 28, and which at their other ends bottom in their respective bores, in the manner shown.

Extending from the chamber 20 is a supply passage 52 through which pressurized water is fed to a distribution passage 54 which communicates, via constructions 56 and 58, with a respective cylinder space 40a and 42a on the upper side of the piston 36 and 38 respectively. An outlet passage 60 and 62 extending from respective upper cylinder spaces 40a, 42a discharges into a collecting line 64, along which the pressurized water leaving the cylinder spaces 40a and 42a is conducted to a cylinder space 40b and 42b located beneath respective pistons 36 and 38, and from said cylinder spaces 40a and 42a back to the pressurized-water source, through respective outlet passages 66 and 68, from where it is again fed to the inlet chamber 20.

Also arranged in the valve-housing body 12 is an outlet valve 70 and an outlet valve 72, which are intended to control the flow of steam and condensation, and liquid coolant respectively from the compression moulding tool T. These return flows of working media enter through an inlet passage 74. The steam, and condensation created therefrom, passes into an inlet chamber 76 and from there out through the outlet valve 70, whereupon the valve opens, and is returned to the steam-generation circuit through an outlet passage 78, while the cooling water passes into a chamber 80 and out therefrom through an outlet passage 82, whereupon the outlet valve 72 opens.

The two outlet valves 70 and 72 are biased in their closing directions by respective thrust springs 84 and 86 and, like the inlet valves 26 and 28, are arranged to be opened alternately by means of associated auxiliary devices, suitably of a design similar to those used to operate the inlet valves, i.e. provided with pistons 88 and 90 respectively which are arranged for axial movement in respective cylinder chambers 92 and 94, and which act upon their respective valve bodies 70 and 72, via piston rods 89 and 91. The cylinder space 92a and the cylinder space 94a located above respective pistons 88 and 90 are connected with the distributing passage 54 via a respective constriction 96 and 98, and communicate with respective cylinder spaces 92b and 94b located beneath the pistons 88 and 90 via outlet passages 93 and 95, the collecting line 64, and the outlet passage 66 for conducting pressurized water from the piston spaces 40b and 42b.

For the purpose of controlling the auxiliary devices of the respective inlet and outlet valves, each of the auxiliary devices is arranged to co-act with a pilot valve 100, 102, 104 and 106 designed to close, when desired, the communication between the upper cylinder spaces 40a, 42a, 92a, and 94b, and the lower cylinder spaces 40b, 42b, 92b and 94b, by closing respective outlet passages 60, 62, 93 and 95. The pilot valves 100, 102, 104 and 106 may be operated pneumatically or electromagnetically.

The valve arrangement according to the invention has the following operational mode when used in the pressing of audio-discs or video-discs, in one or more compression moulding tools connected to the valve arrangement.

For the purpose of passing pressurized steam from the inlet passage 14 to a compression moulding tool T via the outlet passage 30, the inlet valve 26 is caused to open by closing the outlet passage 60 by means of the pilot valve 100. This results in a pressure build-up in the upper cylinder space 40a, creating the total pressure exerted by the spring 22, the pressurized water acting on the underside of the valve body 26 and the load on the underside of the piston 36, whereupon the piston 36 urges the piston rod 44 downwards, therewith causing the valve 26 to move away from its seat 32 and allowing steam to flow through the valve, to the compression moulding tool T.

Approximately at the same time as the valve 26 is opened, the condensation-outlet valve 70 is also opened, by closing the outlet passage 93 by means of the pilot valve 104, upon which the piston 88 and the piston rod 89 open the valve 70 in the aforedescribed manner, so that condensation flowing from the compression moulding tool T can be returned to the steam-generating unit, in a closed circuit.

When the compression moulding tool T has been heated to the extent desired, the inlet valve 26 and the outlet valve 70 are closed, by opening the respective pilot valves 100 and 104. Subsequent to closing the steam inlet and steam outlet valves, the inlet valve 28 for the cooling water is opened, by activation of the pilot valve 102, in a manner to close the outlet passage 62, whereupon the piston 38, through the piston rod 46, causes the valve body 28 to leave its seat and open the valve. At approximately the same time as these events take place, the cooling-water outlet valve 72 is also opened, by activating the pilot valve 106, so that the piston 90 and piston rod 91 open the valve 72, thereby enabling cooling water from the compression moulding tool T to flow through the return inlet passage 74, the chamber 80, the valve 72 and back to the cooling water source, via the outlet passage 82, in a closed circuit. Thus, the respective inlet and outlet valves for steam and water coolant operate alternately in pairs, synchronously with one another.

Because of its structural design, the valve arrangement according to the invention is extremely compact and reliable and enables the cooling medium used to cool the actual compression moulding tool T to be used also to cool, and to operate, the auxiliary devices co-acting with the inlet and outlet valves, and the components associated with these devices, such as sealing rings, etc., thereby considerably extending the times between which servicing need be carried out, and greatly increasing the useful life of the components forming the valve arrangement. Since the valve arrangement is operated hydraulically, the movements carried out by the valve bodies can be accurately controlled, so as to prevent the occurrence of pressure surges and vibration in the system of passages.

I claim:
1. A valve arrangement for supplying alternately a heating medium, preferably steam, and a coolant, preferably water, to at least one compression moulding tool connected to the valve arrangement, said arrangement comprising:

a valve-housing body having arranged therein a heating-medium inlet passage and a coolant inlet passage, which open into a mutually common outlet passage connected to said compression moulding tool;

an inlet valve located between a respective inlet passage and said common outlet passage, said inlet valves being biased towards a respective valve seat;

auxiliary devices each arranged to co-act with a respective one of said inlet valves in a manner to open said inlet valves alternately, each of the auxiliary devices comprises a hydraulic piston mounted in the valve-housing body and arranged to act upon a respective inlet valve in a valve opening direction via a piston rod;

a bypass extending between said coolant inlet passage and said auxiliary devices so as to communicate in common with a first cylinder space located on one side of the respective hydraulic pistons, each of said cylinder spaces in turn communicating with a second space located on the other side of the respective pistons via a return-flow passage;

a pilot valve coordinated with the respective auxiliary device arranged to alternately close off the return-flow passage from the respective auxiliary device; and an outlet passage conducting the coolant leaving the second cylinder spaces away from the valve arrangement.

2. A valve arrangement according to claim 1, wherein the valve-housing body has arranged therein a respective outlet valve for used coolant and heating medium flowing out from the compression moulding tool, said outlet valves being arranged to open and close alternately, to return respective media in closed circuits intended therefor.

3. A valve arrangement according to claim 2, wherein said outlet valves are biased towards a valve-closing position and are arranged to be opened by further auxiliary devices of the same kind as the first mentioned auxiliary devices co-acting with the inlet valves, a first cylinder space of said further auxiliary devices located on one side of a respective hydraulic piston being connected to said bypass, and wherein further pilot valves are provided for alternately closing off respective return-flow passages extending between the first cylinder space of said further auxiliary devices and a second cylinder space located on the other side of the respective hydraulic pistons, said outlet valves being further arranged to be operated alternately by the hydraulic medium from the common bypass.

* * * * *